(12) United States Patent
Seo

(10) Patent No.: US 11,891,003 B2
(45) Date of Patent: Feb. 6, 2024

(54) RESERVOIR TANK FOR VEHICLE

(71) Applicant: Hyundai Wia Corporation, Gyeongsangnam-Do (KR)

(72) Inventor: Hyun Jun Seo, Seoul (KR)

(73) Assignee: Hyundai Wia Corporation, Gyeongsangnam-do (KR)

( * ) Notice: Subject to any disclaimer, the term of this patent is extended or adjusted under 35 U.S.C. 154(b) by 223 days.

(21) Appl. No.: 17/411,654

(22) Filed: Aug. 25, 2021

(65) Prior Publication Data
US 2022/0144195 A1     May 12, 2022

(30) Foreign Application Priority Data
Nov. 9, 2020   (KR) .......................... 10-2020-0148680

(51) Int. Cl.
*B60R 16/08*      (2006.01)
*F01P 11/02*      (2006.01)

(52) U.S. Cl.
CPC ............ *B60R 16/08* (2013.01); *F01P 11/029* (2013.01)

(58) Field of Classification Search
CPC .......... B60R 16/08; F01P 11/029; F01P 11/02
See application file for complete search history.

(56) References Cited

U.S. PATENT DOCUMENTS 11,220,952 B1 *   1/2022   Ayva .................... F01P 11/0204
2018/0283261 A1   10/2018   Morishita et al.

FOREIGN PATENT DOCUMENTS

DE    10 2017 004 632 A1    11/2017
KR        100804551 B1    2/2008

OTHER PUBLICATIONS

Notification of First Office Action dated Oct. 28, 2023 in corresponding Chinese Application No. 202111209438.7.

\* cited by examiner

*Primary Examiner* — Jacob M Amick
(74) *Attorney, Agent, or Firm* — Fox Rothschild LLP

(57) ABSTRACT

A reservoir tank includes first and second chambers separated by partitions. The first chamber is configured such that coolant circulates through the first chamber. The second chamber is provided on a side and spaced apart from the first chamber and is configured such that coolant having a different temperature from the coolant stored in the first chamber circulates through the second chamber. A first partition and a second partition are provided so as to separate the first chamber and the second chamber from each other, and are spaced apart from and facing each other. A middle chamber is defined in a space between the first partition and the second partition and configured such that the coolant from the first chamber or the second chamber circulates through the middle chamber, thereby providing a heat buffer between the first chamber and the second chamber.

11 Claims, 5 Drawing Sheets

RESERVOIR TANK FOR VEHICLE

CROSS REFERENCE TO RELATED APPLICATION

The present application claims under 35 U.S.C. § 119(a) the benefit of Korean Patent Application No. 10-2020-0148680, filed Nov. 9, 2020, the entire contents of which are incorporated by reference herein.

BACKGROUND

(a) Technical Field

The present disclosure generally relates to a reservoir tank including two chambers in which coolant having different temperatures is stored, more particularly, to the reservoir tank provided with a middle chamber configured to exchange coolant with one of the two chambers through a circulation hole so as to act as a heat buffer between the two chambers.

(b) Description of the Related Art

A reservoir tank is a tank in which coolant of a vehicle is stored. The reservoir tank is provided on the vehicle to cool an engine, electric components, a battery, and the like of the vehicle using the coolant. However, when multiple reservoir tanks are used, and a respective reservoir tank is provided to cool each of the engine, the battery, the electric components, and the like, a variety of problems may occur. For example, space inside the vehicle is limited, a configuration of the vehicle is complicated, and each of the tanks must be supplied with the coolant. In order to overcome such problems, a single integrated reservoir tank has been utilized. The integrated reservoir tank is configured such that an internal space thereof is divided into chambers, where coolant is supplied from each of the chambers to various parts requiring the coolant. The coolant is only required to be supplied to the single integrated reservoir tank.

However, in the integrated reservoir tank of the related art, the chambers are only divided by a partition, and heat exchange is performed through the partition between the chambers. The temperature of the coolant in each chamber of the tank may be changed, thereby reducing coolant performance, which is problematic.

The foregoing is intended merely to aid in the understanding of the background of the present disclosure, and is not intended to mean that the present disclosure falls within the purview of the related art that is already known to those skilled in the art.

SUMMARY

Accordingly, the present disclosure proposes a reservoir tank including two chambers in which coolant having different temperatures is stored, partitions separating the chambers, and a middle chamber defined between the partitions, where the middle chamber exchanges coolant with one of the two chambers through a circulation hole so as to act as a heat buffer between the two chambers.

In order to achieve the above objective, according to one aspect of the present disclosure, there is provided a reservoir tank including: a first chamber configured such that coolant circulates through the first chamber or is stored in the first chamber; a second chamber provided on a side and spaced apart from the first chamber and configured such that coolant having a different temperature from the coolant stored in the first chamber circulates through the second chamber or is stored in the second chamber; a first partition and a second partition provided in a space between the first chamber and the second chamber to separate the first chamber and the second chamber from each other, and spaced apart from and facing each other; and a middle chamber defined in a space between the first partition and the second partition and configured such that the coolant from the first chamber or the second chamber circulates through the middle chamber or is stored in the middle chamber, thereby providing a heat buffer between the first chamber and the second chamber.

The circulation hole may be provided in a lower end of the first partition or the second partition. When the circulation hole is provided in the first partition, heat exchange may occur between the coolant in the first chamber and the coolant in the middle chamber. When the circulation hole is provided in the second partition, heat exchange may occur between the coolant in the second chamber and the coolant in the middle chamber.

The middle chamber may perform heat exchange with the first chamber and the second chamber through the first partition and the second partition, such that the temperature of the coolant circulating or stored in the middle chamber is between the temperature of the coolant in the first chamber and the temperature of the coolant in the second chamber.

An input channel through which the coolant is introduced to the first chamber or the second chamber and an output channel through which the coolant is discharged from the first chamber or the second chamber may be provided outside the first chamber or the second chamber, the input channel and the output channel being provided integrally with the first chamber or the second chamber.

The circulation hole may be narrower than either the input channel or the output channel of the first chamber or the second chamber, and the flow rate of the coolant flowing through the circulation hole may be less than the flow rate of the coolant flowing through either the input channel or the output channel.

The input channel may be provided above the output channel. The coolant introduced to the first chamber or the second chamber through the input channel may be introduced to the middle chamber through the circulation hole or be discharged from the first chamber or the second chamber through the output channel.

A coupling recess to which a pump is coupled may be provided integrally with the first chamber or the second chamber, in a position outside the lower portion of the first chamber or the second chamber. When the output channel is connected to the coupling recess and the pump coupled to the coupling recess operates, the coolant may circulate through the input channel or the output channel.

When the pump is coupled to the coupling recess, the impeller or the pump housing of the pump may be located in the coupling recess and a coolant nozzle is provided on a sidewall of the coupling recess.

Open holes may be provided in upper ends of the first partition and the second partition, and the coolant is exchanged among the first chamber, the middle chamber, and the second chamber through the open holes.

A baffle plate covering an upper end of the first chamber, the middle chamber, or the second chamber may be provided on top of the first partition and the second partition. Gas within the first chamber, the middle chamber, or the second chamber may be discharged above the first chamber, the middle chamber, or the second chamber through the baffle plate.

One or more tank caps may be provided on top of the first chamber, the middle chamber, or the second chamber. The coolant may be supplied to the first chamber, the middle chamber, or the second chamber through the tank caps, or gas may be discharged from inside the first chamber, the middle chamber, or the second chamber through the tank caps.

According to the present disclosure, the reservoir tank includes the two chambers in which coolant having different temperatures is stored, the partitions separating the chambers, and the middle chamber defined between the partitions, wherein the middle chamber exchanges coolant with one of the two chambers through a circulation hole so as to act as a heat buffer between the two chambers.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE DISCLOSURE

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Figure 1:
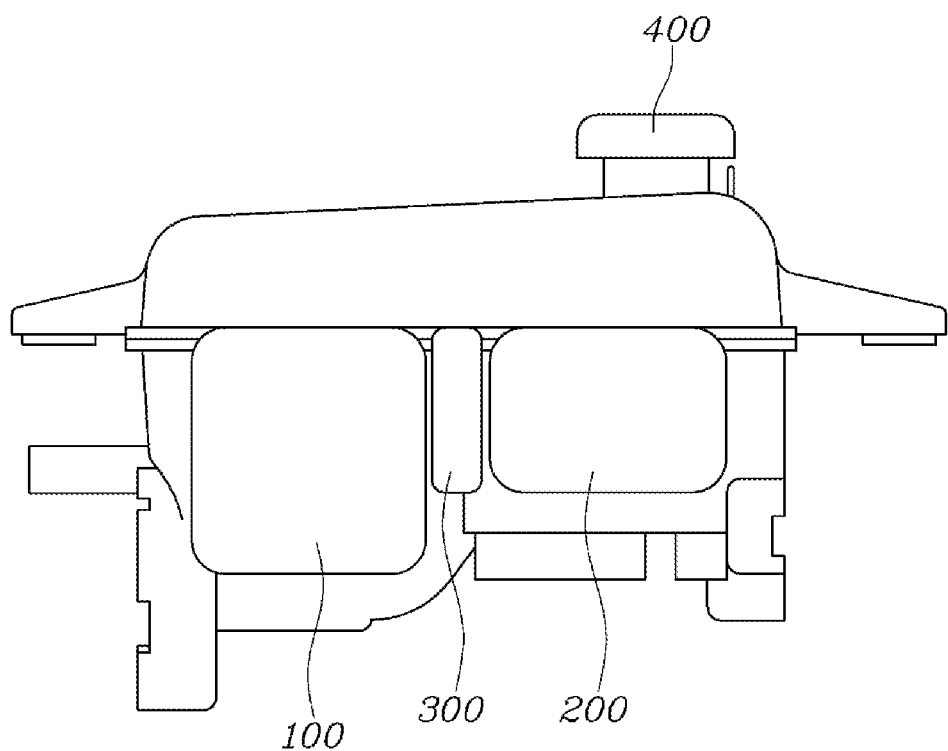
FIG. 1 is a side view illustrating a reservoir tank according to embodiments of the present disclosure.
Figure 2:
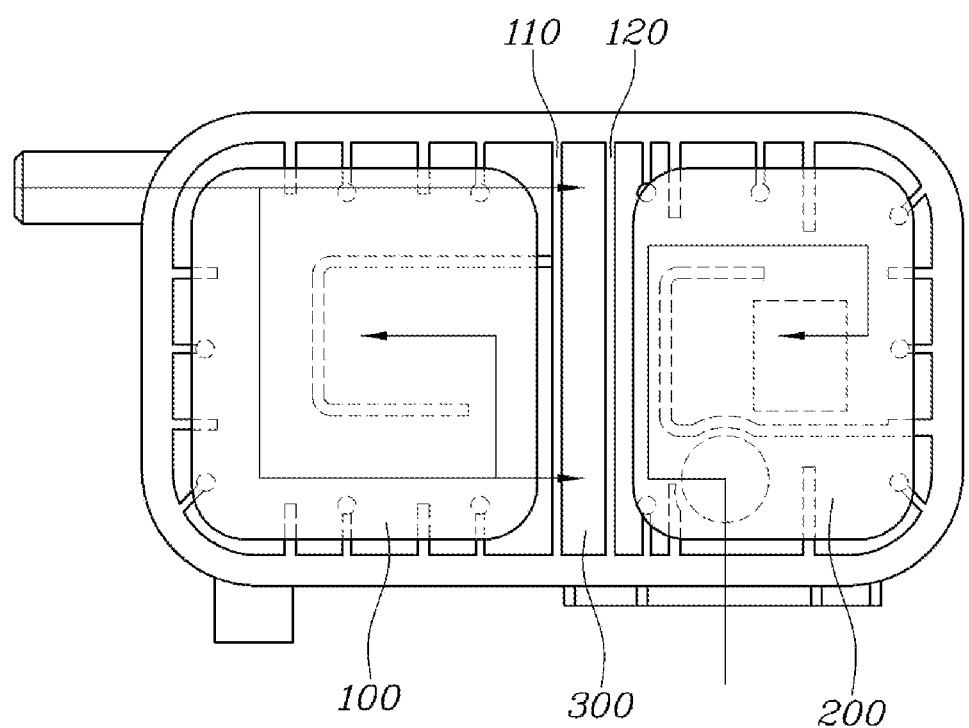
FIG. 2 is a plan view illustrating the internal structure of the reservoir tank according to embodiments of the present disclosure.
Figure 3:
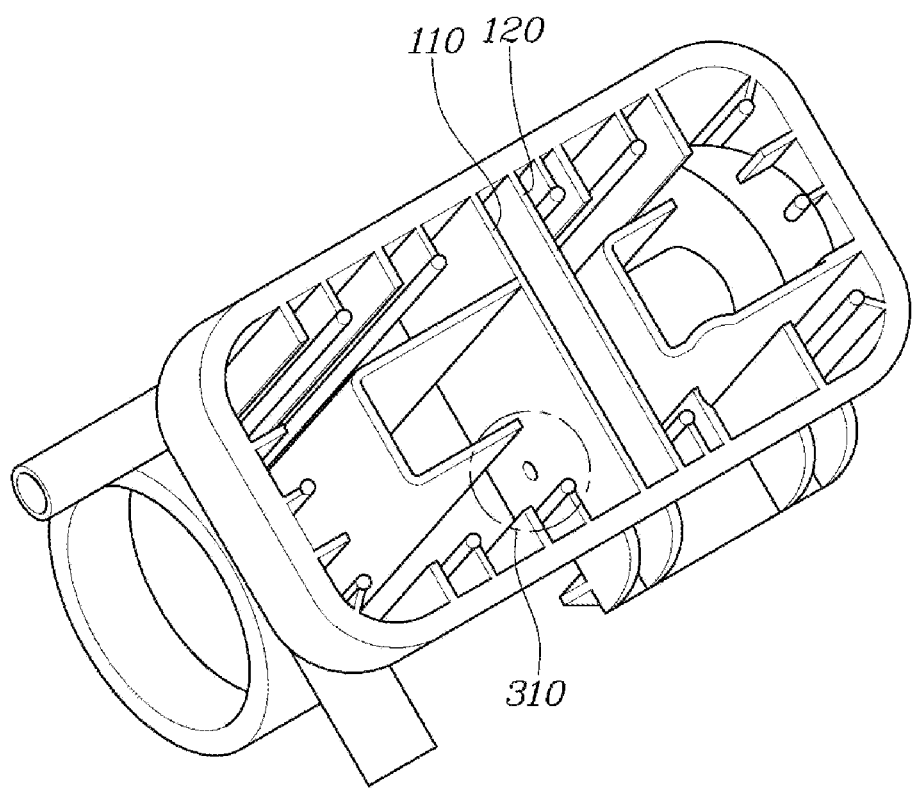
FIG. 3 is a perspective view illustrating the internal structure of the reservoir tank according to embodiments of the present disclosure.
Figure 4:
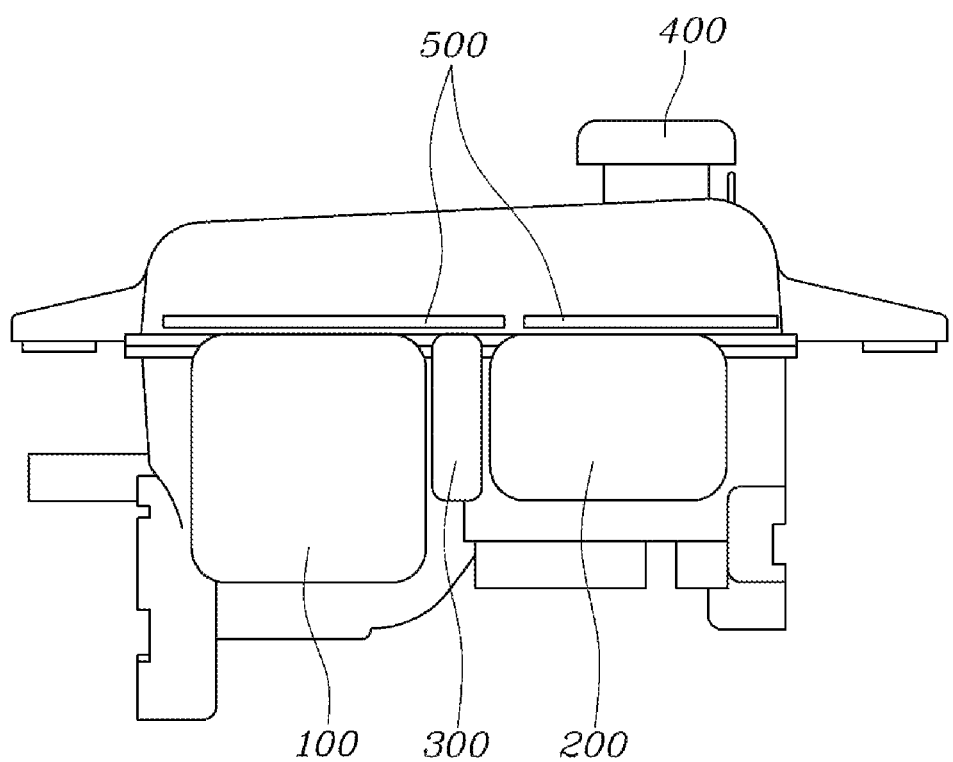
FIG. 4 is a view illustrating the reservoir tank according to embodiments of the present disclosure, with a baffle plate being provided on top of the reservoir tank.
Figure 5:
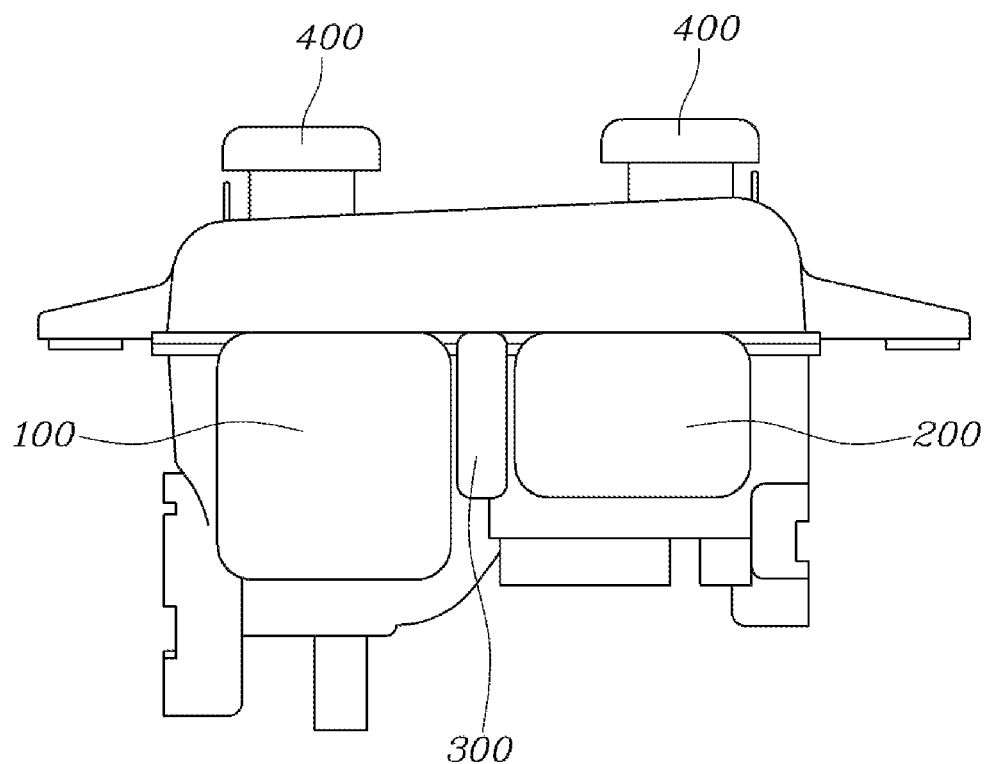
FIG. 5 is a view illustrating the reservoir tank according to embodiments of the present disclosure, with a plurality of tank caps being provided on top of the reservoir tank.

FIG. 1 is a side view illustrating a reservoir tank according to embodiments of the present disclosure, FIG. 2 is a plan view illustrating the internal structure of the reservoir tank according to embodiments of the present disclosure, FIG. 3 is a perspective view illustrating the internal structure of the reservoir tank according to embodiments of the present disclosure, FIG. 4 is a view illustrating the reservoir tank according to embodiments of the present disclosure, with a baffle plate being provided on top of the reservoir tank, and FIG. 5 is a view illustrating the reservoir tank according to embodiments of the present disclosure, with a plurality of tank caps being provided on top of the reservoir tank.

FIG. 1 is a side view illustrating a reservoir tank according to embodiments of the present disclosure, and FIG. 2 is a plan view illustrating the internal structure of the reservoir tank according to embodiments of the present disclosure. The reservoir tank according to embodiments of the present disclosure includes: a first chamber 100 configured such that coolant circulates through the first chamber 100 or is stored in the first chamber 100; a second chamber 200 provided on a side and spaced apart from the first chamber 100 and configured such that coolant having a different temperature from the coolant stored in the first chamber 100 circulates through the second chamber 200 or is stored in the second chamber 200; a first partition 110 and a second partition 120 provided in a space between the first chamber 100 and the second chamber 200 to separate the first chamber 100 and the second chamber 200 from each other and spaced apart from and facing each other; and a middle chamber 300 defined in a space between the first partition 110 and the second partition 120 and configured such that the coolant from the first chamber 100 or the second chamber 200 circulates through the middle chamber 300 or is stored in the middle chamber 300, thereby providing a heat buffer between the first chamber 100 and the second chamber 200.

The internal space of the integrated reservoir tank of the related art is simply divided into two chambers by a thin partition made from plastic. This structure has a fatal flaw in that coolant in one tank exchanges heat with coolant in the other tank through the partition, thereby reducing cooling efficiency. Thus, the reservoir tank according to embodiments of the present disclosure is provided with the first chamber 100, the second chamber 200, and the middle chamber 300, in which the middle chamber 300 defined by the first partition 110 and the second partition 120 may perform a buffering function in heat exchange between the first chamber 100 and the second chamber 200, thereby minimizing direct heat exchange between the first chamber 100 and the second chamber 200 and improving thermal efficiency.

In particular, the coolant in the first chamber 100 is managed as a low-temperature layer connected to a battery cooling circuit such that the maximum temperature thereof is 35° C., while the coolant in the second chamber 200 is managed as a high-temperature layer connected to a drive unit cooling circuit such that the maximum temperature thereof is 85° C. Since the coolant having different temperatures circulates through and is stored in the first chamber 100 and the second chamber 200, when only the thin partition made from plastic is present between the first chamber 100 and the second chamber 200, heat exchange easily occurs between the coolant in the first 100 and the coolant in the second chamber 200, thereby creating heat loss in the coolant in each chamber. Accordingly, the middle chamber 300 defined by spacing the first partition 110 and the second partition 120 apart from each other may act as a heat buffering space between the first chamber 100 and the second chamber 200 so as to minimize heat exchange between the chambers and prevent heat loss, thereby maximizing the heat efficiency of the reservoir tank.

In addition, the middle chamber 300 is gradually filled with the coolant introduced from the first chamber 100 or the second chamber 200 through a circulation hole 310 formed in the first partition 110 or the second partition 120. The coolant filling the middle chamber 300 has a temperature between the temperature of the coolant in the first chamber 100 and the temperature of the coolant in the second chamber 200, thereby minimizing heat exchange between the first chamber 100 and the second chamber 200 and preventing heat loss.

For example, in a situation in which the temperature of the coolant in the first chamber 100 is 35° C. and the temperature of the coolant in the second chamber 200 is 65° C., the amount of temperature exchange between the chambers in the reservoir tank according to embodiments of the present disclosure may remain at the level of about 0.1° C., while the amount of temperature exchange between the chambers of the integrated reservoir tank of the related art is about 1° C.

In addition, since the middle chamber 300 is gradually filled with the coolant introduced through the circulation hole 310, even in the case that the temperature of the coolant circulating or stored in one of the first chamber 100 and the second chamber 200 changes suddenly, the temperature of the coolant in the middle chamber 300 changes gradually instead of changing suddenly. Consequently, the middle chamber 300 may properly act as the heat buffering space.

FIG. 3 is a perspective view illustrating the internal structure of the reservoir tank according to embodiments of the present disclosure. In the reservoir tank according to embodiments of the present disclosure, the circulation hole 310 is provided in the lower end of the first partition 110 or the second partition 120. When the circulation hole 310 is provided in the first partition 110, heat exchange may occur between the coolant in the first chamber 100 and the coolant in the middle chamber 300. When the circulation hole 310 is provided in the second partition 120, heat exchange may occur between the coolant in the second chamber 200 and the coolant in the middle chamber 300. The middle chamber 300 performs heat exchange with the first chamber 100 and the second chamber 200 through the first partition 110 and the second partition 120. The temperature of the coolant circulating or stored in the middle chamber 300 may be between the temperature of the coolant in the first chamber 100 and the temperature of the coolant in the second chamber 200.

In particular, the circulation hole 310 is provided in one partition of the first partition 110 and the second partition 120. The circulation hole 310 is formed in the shape of a small hole in the lower end of the partition. Thus, the middle chamber 300 is gradually filled with the coolant introduced thereto through the circulation hole 310 from the first chamber 100 or the second chamber 200. In addition, the middle chamber 300 is located between the first chamber 100 and the second chamber 200 and performs heat exchange with the first chamber 100 and the second chamber 200 through the first partition 110 and the second partition 120, and thus the temperature of the middle chamber 300 is between the temperature of the coolant in the first chamber 100 and the temperature of the coolant in the second chamber 200. Since both the first chamber 100 and the second chamber 200 are prevented from performing direct heat exchange by the middle chamber 300, the heat loss of the reservoir tank may be reduced and the heat efficiency of the reservoir tank may be maximized.

In addition, in the reservoir tank according to embodiments of the present disclosure, an input channel through which the coolant is introduced to the first chamber 100 or the second chamber 200 and an output channel through which the coolant is discharged from the first chamber 100 or the second chamber 200 are provided outside the first chamber 100 or the second chamber 200. The input channel and the output channel may be formed integrally with the first chamber 100 or the second chamber 200.

Referring to FIGS. 2 and 3, a channel entering from one portion outside the reservoir tank is an input channel provided in the first chamber 100, and a channel extending from the central portion of the bottom of the first chamber 100 to the left of the reservoir tank is an output channel through which the coolant is discharged. In the second chamber 200, an input channel and an output channel are provided on one portion outside reservoir tank in the same manner. The directions of the input channel and the output channel of the second chamber 200 are opposite to the directions of the input channel and the output channel of the first chamber 100. In addition, the output channel of each chamber may be formed not only in the lateral direction but also in the lower portion or in another lateral direction of each chamber. Since the input channel and the output channel are formed integrally with each chamber on one side of the chamber, it is possible to easily simultaneously fabricate the chambers and the channels, thereby improving the efficiency of fabrication of the reservoir tank.

In addition, in the reservoir tank according to embodiments of the present disclosure, the circulation hole 310 is formed to be narrower than either the input channel or the output channel of the first chamber 100 or the second chamber 200. The flow rate of the coolant flowing through the circulation hole 310 may be less than the flow rate of the coolant flowing through either the input channel or the output channel. While the coolant from the first chamber 100 or the second chamber 200 is introduced to the middle chamber 300 through the circulation hole 310, the movement of the coolant between the middle chamber 300 and the first chamber 100 or the second chamber 200 is not relatively smooth, since the circulation hole 310 is smaller than either the input channel or the output channel through which the coolant flows. Thus, the temperature of the coolant in the middle chamber 300 is between the temperature of the coolant in the first chamber 100 and the temperature of the coolant in the second chamber 200, and thus, the middle chamber 300 may properly act as a heat buffer between the first and second chambers.

In addition, in the reservoir tank according to embodiments of the present disclosure, the input channel may be provided above the output channel, and the coolant introduced to the first chamber 100 or the second chamber 200 through the input channel may be introduced to the middle chamber 300 through the circulation hole 310 or be discharged from the first chamber 100 or the second chamber 200 through the output channel. Thus, the coolant introduced to the first chamber 100 or the second chamber 200 is introduced through the input channel from a side opposite the first partition 110 or the second partition 120. A portion of the introduced coolant is introduced to the middle chamber 300 through the circulation hole 310 provided in the lower end of the second partition 120 or is discharged through the output channel in the lower end of the first chamber 100 or the second chamber 200.

In addition, in the reservoir tank according to embodiments of the present disclosure, a coupling recess to which a pump is coupled is formed integrally with the first chamber 100 or the second chamber 200, in a position outside the lower portion of the first chamber 100 or the second chamber 200. In a situation in which the output channel is connected to the coupling recess and the pump coupled to the coupling recess operates, the coolant may circulate through the input channel or the output channel. When the pump is coupled to the coupling recess, the impeller or the pump housing of the pump may be located in the coupling recess and a coolant nozzle may be provided on a sidewall of the coupling recess.

In particular, the output channel is connected to the pump through the coolant nozzle provided on the sidewall of the coupling recess. When the pump is coupled to the coupling recess, the impeller or the pump housing of the pump is located in the coupling recess, such that the coolant may flow through the pump. In addition, the coupling recess to which the pump is coupled is formed integrally with the first chamber 100 or the second chamber 200. Accordingly, the efficiency of fabrication of the reservoir tank may be improved.

FIG. 4 is a view illustrating the reservoir tank according to embodiments of the present disclosure, with a baffle plate being provided on top of the reservoir tank. In the reservoir tank according to embodiments of the present disclosure, open holes are formed in the upper ends of the first partition 110 and the second partition 120. The coolant may be exchanged among the first chamber 100, the middle chamber 300, and the second chamber 200 through the open holes. The open holes may be formed in the upper portions of the partitions. The first chamber 100 or the second chamber 200 may be simultaneously supplied with the coolant. When the coolant is excessive in one chamber, the coolant may be transferred to the other chamber, so that the balance of the coolant may be maintained.

In addition, in the reservoir tank according to embodiments of the present disclosure, a baffle plate 500 covering the upper end of the first chamber 100, the middle chamber 300, or the second chamber 200 may be provided on top of the first partition 110 and the second partition 120. Gas within the first chamber 100, the middle chamber 300, or the second chamber 200 may be discharged above the first chamber 100, the middle chamber 300, or the second chamber 200 through the baffle plate 500.

In particular, in a channel, such as the input channel or the output channel, through which the coolant circulates or each of the chambers, an instantaneous pressure difference or vibration incurred by the operation of the pump during the circulation of the coolant may cause cavitation, thereby creating bubbles in the channel or the chamber. When such bubbles locally accumulate on a cooling line of an electric component or a battery to be cooled, heat may not be dissipated, thereby causing a risk of malfunction and fire. Thus, bubbles, air, or the like present in the channel or the chamber move upward to the upper end of the first chamber 100, the second chamber 200, or the middle chamber 300 to be discharged.

In addition, in a situation in which the baffle plate 500 is provided on top of the first chamber 100, the second chamber 200, or the middle chamber 300, it is possible to discharge bubbles or air may through the upper end of the first chamber 100, the second chamber 200, or the middle chamber 300 while preventing the coolant in one chamber from mixing with the coolant in another chamber.

FIG. 5 is a view illustrating the reservoir tank according to embodiments of the present disclosure, with a plurality of tank caps being provided on top of the reservoir tank. In the reservoir tank according to embodiments of the present disclosure, one or more tank caps 400 (two tank caps in FIG. 5) are provided on top of the first chamber 100, the middle chamber 300, or the second chamber 200. It is possible to supply the coolant to the first chamber 100, the middle chamber 300, or the second chamber 200 or to discharge gas from inside the first chamber 100, the middle chamber 300, or the second chamber 200 through the tank caps 400.

In particular, the first chamber 100, the second chamber 200, or the middle chamber 300 may exchange gas or the coolant with another one of the first chamber 100, the second chamber 200, and the middle chamber 300 through the open holes in the upper ends thereof. By providing a single tank cap 400, the coolant may be simultaneously supplied to the first chamber 100, the second chamber 200, and the middle chamber 300, or gas, such as bubbles or air, created in the channel or the chamber may be discharged from the tank using the tank cap 500.

In addition, the first chamber 100 and the second chamber 200 may be completely separated without the open holes. In this case, the tank caps 400 may be provided on top of the first chamber 100 and the second chamber 200, respectively, to supply the coolant to the first chamber 100 and the second chamber 200. Air produced in the chambers may be discharged from the reservoir tank through the tank caps 400.

In addition, in the reservoir tank according to embodiments of the present disclosure, a heat exchanger may be provided on top of the first chamber 100, the second chamber 200, or the middle chamber 300 in order to efficiently perform heat exchange between the chambers and maximize heat efficiency of the reservoir tank.

Although the specific embodiments of the present disclosure have been described for illustrative purposes, those skilled in the art will appreciate that various modifications, additions and substitutions are possible, without departing from the scope and spirit of the present disclosure as disclosed in the accompanying claims.

What is claimed is:

1. A reservoir tank, comprising:
   a first chamber configured such that coolant circulates through the first chamber or is stored in the first chamber;
   a second chamber provided on a side and spaced apart from the first chamber and configured such that coolant having a different temperature from the coolant stored in the first chamber circulates through the second chamber or is stored in the second chamber;

a first partition and a second partition provided in a space between the first chamber and the second chamber to separate the first chamber and the second chamber from each other, and spaced apart from and facing each other; and a middle chamber defined in a space between the first partition and the second partition and configured such that the coolant from the first chamber or the second chamber circulates through the middle chamber or is stored in the middle chamber, thereby providing a heat buffer between the first chamber and the second chamber, wherein a baffle plate covering an upper end of the first chamber, the middle chamber, or the second chamber is provided on top of the first partition and the second partition, and gas within the first chamber, the middle chamber, or the second chamber is discharged above the first chamber, the middle chamber, or the second chamber through the baffle plate.

2. The reservoir tank according to claim 1, wherein a circulation hole is provided in a lower end of the first partition or the second partition, such that if the circulation hole is provided in the first partition, heat exchange occurs between the coolant in the first chamber and the coolant in the middle chamber, or if the circulation hole is provided in the second partition, heat exchange occurs between the coolant in the second chamber and the coolant in the middle chamber.

3. The reservoir tank according to claim 1, wherein the middle chamber performs heat exchange with the first chamber and the second chamber through the first partition and the second partition, such that a temperature of the coolant circulating or stored in the middle chamber is between a temperature of the coolant in the first chamber and a temperature of the coolant in the second chamber.

4. The reservoir tank according to claim 2, wherein an input channel through which the coolant is introduced to the first chamber or the second chamber and an output channel through which the coolant is discharged from the first chamber or the second chamber are provided outside the first chamber or the second chamber, the input channel and the output channel being provided integrally with the first chamber or the second chamber.

5. The reservoir tank according to claim 4, wherein the circulation hole is narrower than either the input channel or the output channel of the first chamber or the second chamber, and a flow rate of the coolant flowing through the circulation hole is less than a flow rate of the coolant flowing through either the input channel or the output channel.

6. The reservoir tank according to claim 4, wherein the input channel is provided above the output channel, and the coolant introduced to the first chamber or the second chamber through the input channel is introduced to the middle chamber through the circulation hole or is discharged from the first chamber or the second chamber through the output channel.

7. The reservoir tank according to claim 4, wherein a coupling recess to which a pump is coupled is provided integrally with the first chamber or the second chamber, in a position outside a lower portion of the first chamber or the second chamber, and when the output channel is connected to the coupling recess and the pump coupled to the coupling recess operates, the coolant circulates through the input channel or the output channel.

8. The reservoir tank according to claim 7, wherein when the pump is coupled to the coupling recess, an impeller or a pump housing of the pump is located in the coupling recess and a coolant nozzle is provided on a sidewall of the coupling recess.

9. The reservoir tank according to claim 1, wherein open holes are provided in upper ends of the first partition and the second partition, and the coolant is exchanged among the first chamber, the middle chamber, and the second chamber through the open holes.

10. The reservoir tank according to claim 1, wherein one or more tank caps are provided on top of the first chamber, the middle chamber, or the second chamber, the coolant is supplied to the first chamber, the middle chamber, or the second chamber through the tank caps, or gas is discharged from inside the first chamber, the middle chamber, or the second chamber through the tank caps.

11. A reservoir tank, comprising:

a first chamber configured such that coolant circulates through the first chamber or is stored in the first chamber;

a second chamber provided on a side and spaced apart from the first chamber and configured such that coolant having a different temperature from the coolant stored in the first chamber circulates through the second chamber or is stored in the second chamber;

a first partition and a second partition provided in a space between the first chamber and the second chamber to separate the first chamber and the second chamber from each other, and spaced apart from and facing each other; and a middle chamber defined in a space between the first partition and the second partition and configured such that the coolant from the first chamber or the second chamber circulates through the middle chamber or is stored in the middle chamber, thereby providing a heat buffer between the first chamber and the second chamber, wherein an input channel through which the coolant is introduced to the first chamber or the second chamber and an output channel through which the coolant is discharged from the first chamber or the second chamber are provided outside the first chamber or the second chamber, the input channel and the output channel being provided integrally with the first chamber or the second chamber, and wherein a coupling recess to which a pump is coupled is provided integrally with the first chamber or the second chamber, in a position outside a lower portion of the first chamber or the second chamber, and when the output channel is connected to the coupling recess and the pump coupled to the coupling recess operates, the coolant circulates through the input channel or the output channel.

* * * * *